July 1, 1958  G. E. ARMINGTON  2,841,231
POWER STEERING APPARATUS FOR SHARP TURNING
Filed Feb. 2, 1954  3 Sheets-Sheet 1
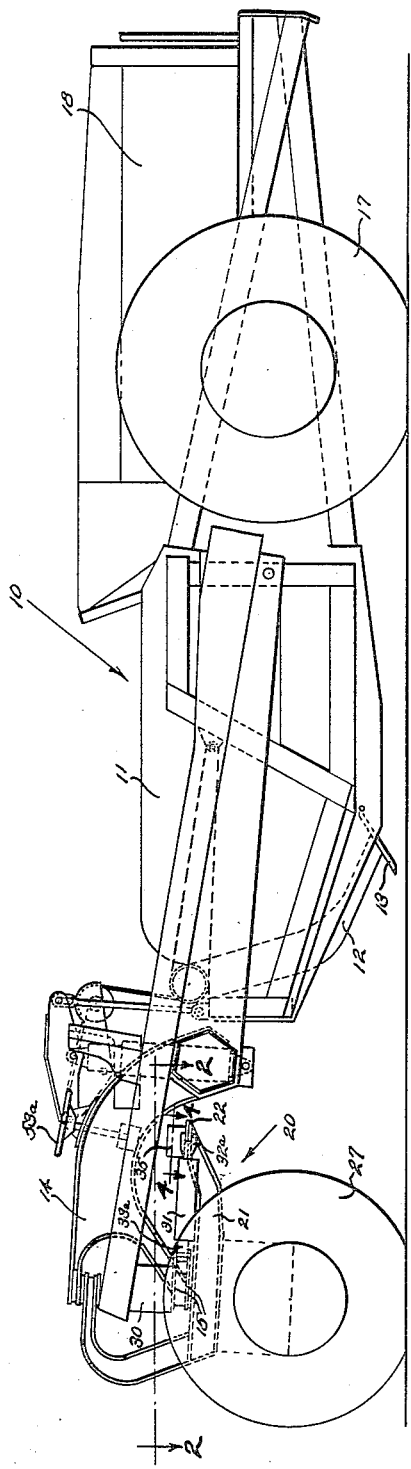
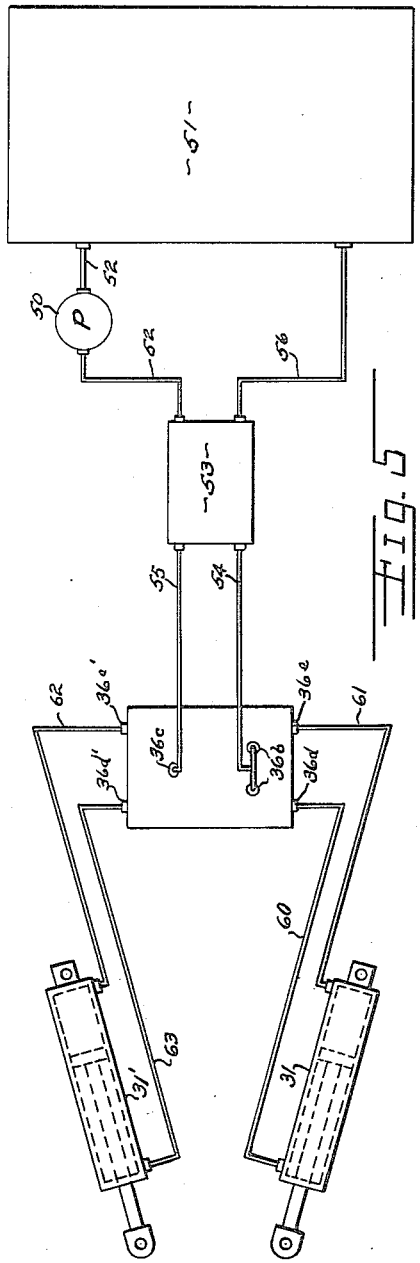
INVENTOR.
GEORGE E. ARMINGTON
BY
*Hyde, Meyer, Baldwin & Doran*
ATTORNEYS

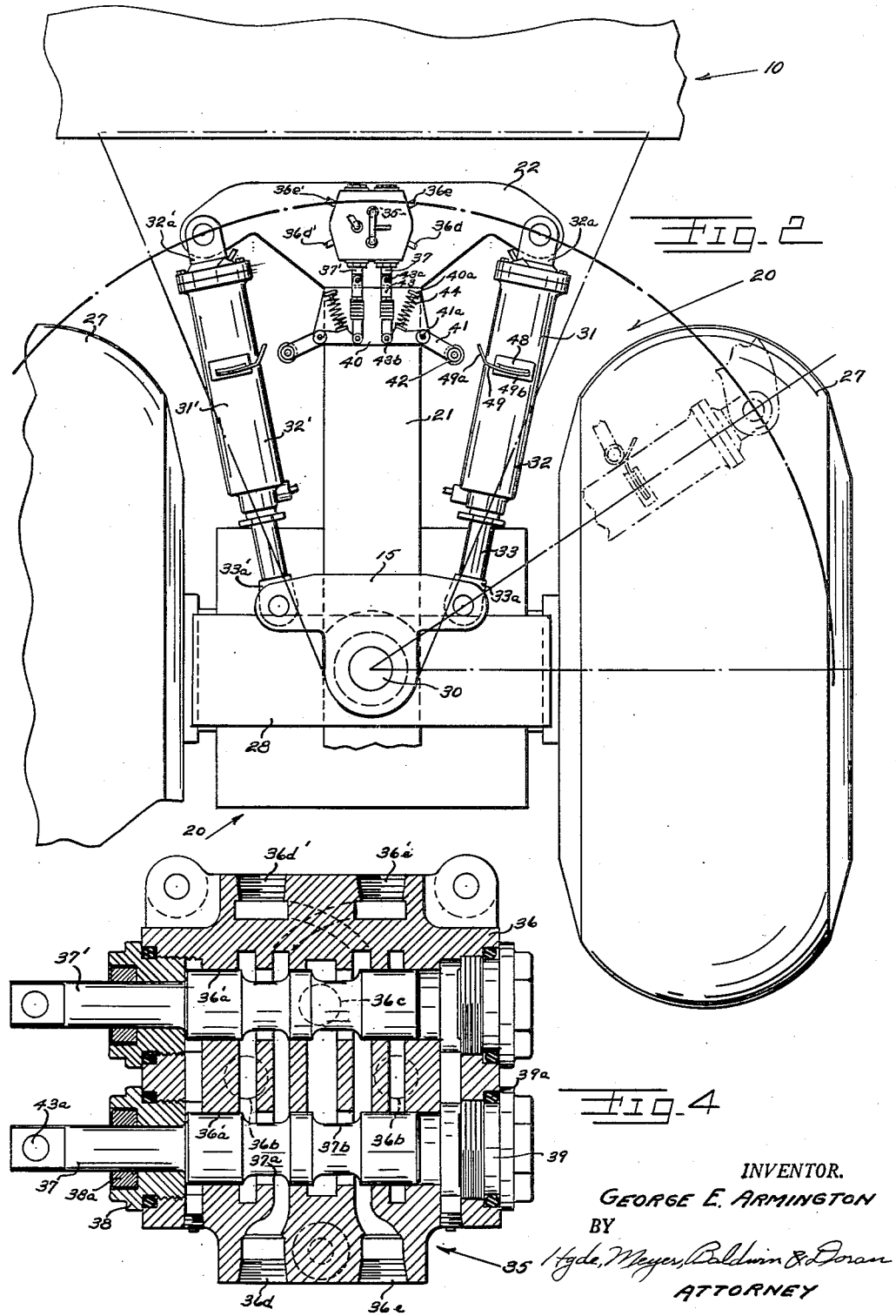

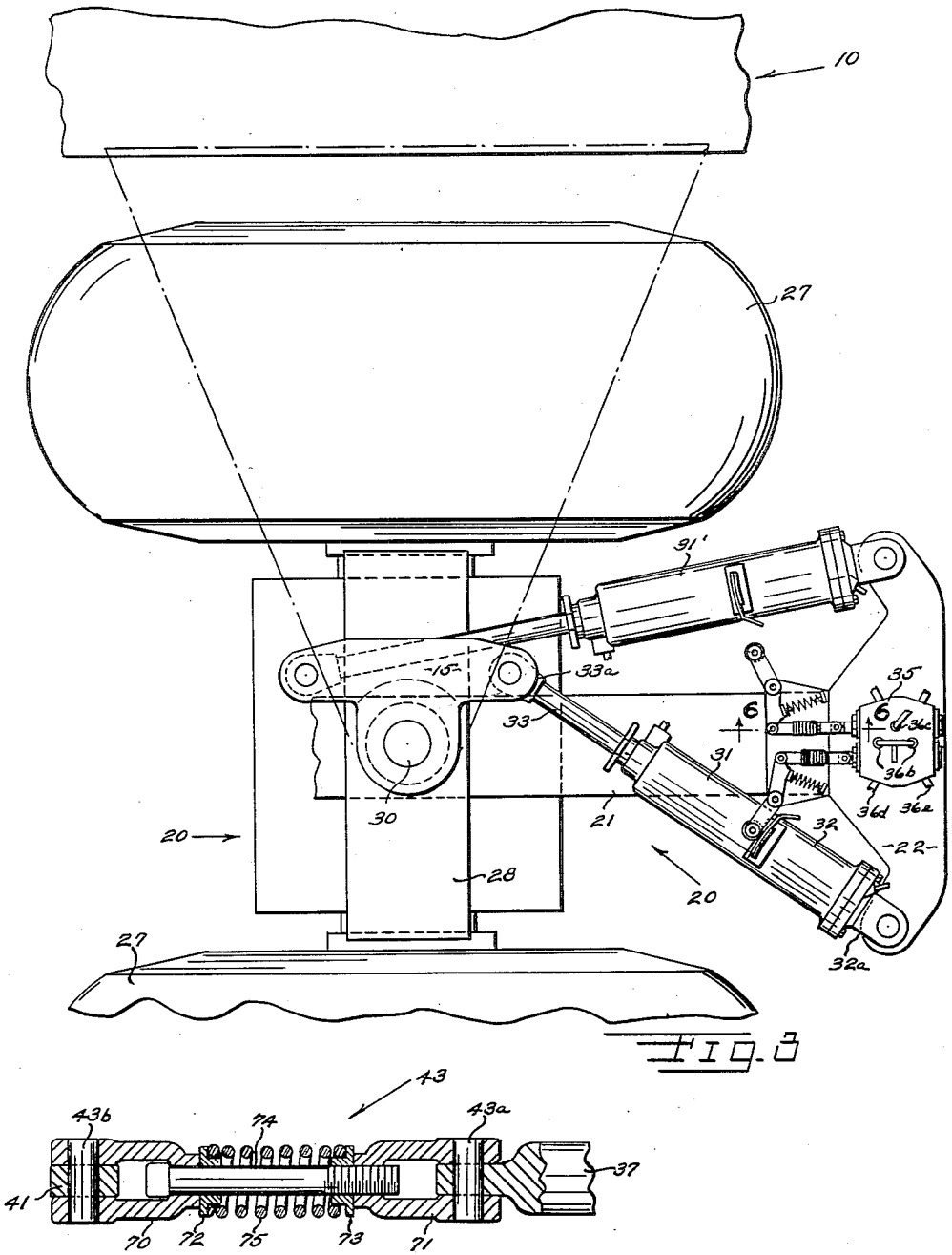

United States Patent Office 2,841,231
Patented July 1, 1958

2,841,231
POWER STEERING APPARATUS FOR SHARP TURNING

George E. Armington, Cleveland Heights, Ohio, assignor to General Motors Corporation, Detroit, Mich., a corporation of Delaware Application February 2, 1954, Serial No. 407,743

21 Claims. (Cl. 180—79.2)

This invention relates to improvements in a steering apparatus and more particularly to a power steering apparatus for sharp turning.

One of the objects of the present invention is to provide a steering apparatus capable of swinging through a steering arc up to 180°.

Another object of the present invention is to provide a novel means for reversing the direction of the force exerted by an extensible link connection in a steering apparatus as it swings over dead center position, and more specifically wherein this link connection is a fluid pressure actuated steering jack and the fluid flow in said jack is reversed.

Another object of the present invention is to provide a vehicle with a steerable member pivotally connected thereto and having rolling support means, wherein said vehicle is steered by one or more jacks carried by said steerable member and swingable therewith.

Other features of this invention reside in the arrangement and design of the parts for carrying out their appropriate function.

Other objects and advantages of this invention will be apparent from the accompanying drawings and description and the essential features will be set forth in the appended claims.

In the drawings,

Fig. 1 is a side elevational view of a rear engine driven digging and carrying scraper having the steering apparatus of the present invention on its front wheels;

Fig. 2 is an enlarged fragmental top plan view taken along the line 2—2 of Fig. 1 with the wheels in their straight ahead position in solid lines with a portion of one of the jacks shown in its over dead center position in dot-dash lines, and with fluid pressure hose lines omitted for clarity;

Fig. 3 is a view, similar to Fig. 2, with the wheels steered 90° from the straight ahead position;

Fig. 4 is a horizontal sectional view along the line 4—4 in Fig. 1 through the flow reversing valve independently controlling the flow to each steering jack;

Fig. 5 is a diagrammatic layout of the hydraulic flow system; while

Fig. 6 is an enlarged longitudinal sectional view, along the line 6—6 in Fig. 3, of a connecting link in the valve operating mechanism.

Those familiar with this art will recognize that my invention may be applied in many ways, for example, as a front or rear steering apparatus for any type vehicle. But, I have chosen to illustrate the same as a front wheel steering apparatus for a digging and carrying scraper.

This digging and carrying scraper, illustrated in Fig. 1, has a body member 10 resembling the type disclosed in the copending U. S. patent application entitled "Digging and Carrying Scraper," filed on May 14, 1952 by Edward R. Fryer and William J. Adams, Serial No. 287,772, now Patent No. 2,773,320. This body member 10 includes a scraper bowl 11 having an open front closed by a movable apron 12, a cutting edge 13 to perform the digging operation, and a supporting yoke 14 extending forwardly from the bowl for supporting the front of the scraper. The front end of the yoke 14 in the present application includes two generally parallel, horizontally extending, registering, T-shaped plates 15, 15 in Figs. 1, 2 and 3 fixed to the leading portion of yoke 14. These plates are slightly spaced apart vertically to accommodate the steering apparatus. The rear or right-hand end of the body member 10 (as viewed in Fig. 1) is supported by laterally spaced rear wheels 17, 17 having tires directly under a rear drive engine 18.

The front of the digging and carrying scraper or vehicle has a steerable member 20 pivotally connected to the body member 10 by a trunnion or pivot pin 30 for steering about a generally vertical steering axis. This steerable member 20 in Figs. 1, 2 and 3 includes a longitudinally extending I-beam 21 having an upwardly bent rear end, seen in Fig. 1 to which is attached a cross plate 22 to form a frame of generally T-shape. Front wheels are provided on this steerable member 20 taking the form of laterally spaced wheels 27, 27 having tires and being rotatably mounted on an axle 28 rigidly secured to the frame of the steerable member 20 and straddling the axis of pivot pin 30.

Variations of this structure should be readily apparent to anyone skilled in the art. For example, the wheels 17 and 27 may take the form of other type rolling support means such as an endless driving track. Also, the steerable member 20 may take the form of a conventional two-wheeled tractor with these wheels driven by a motor on said tractor supported cantilever fashion ahead of said wheels. Then, the rear drive motor 18 may not be needed. Also, steerable member 20 may be located at the rear instead of at the front of the vehicle.

Two fluid pressure operated steering motors, such as steering jacks 31, 31', are provided for steering the vehicle by turning the steerable member 20 about the axis 30. Each of these jacks is operatively connected at one end to the body member 10 and at the other end to the steerable member 20. Jack 31 and its end connections are located on one side of the longitudinal center line of the vehicle through the steering axis 30 when in the straight ahead steering position of Fig. 2 and the other jack with its end connections is located on the other side thereof. These jacks are mirror images of each other and mounted symmetrically about the longitudinal center line so that only one need be described. Hereinafter, the reference number applying to the jack on the right in Fig. 2 will be given an unprimed designation while the one on the left will have a corresponding primed reference numeral.

The jack 31, for example, includes a cylinder 32 with a piston member 33 reciprocably mounted therein and actuated by pressure fluid with this fluid being preferably of the hydraulic type such as oil. Clevis type end connections 32a and 33a are formed at the opposite ends of the jack to be pivotally secured respectively to the outer end of the plate 22 of the steerable member 20 and to the outer end of the plate 15 of the body member 10. The clevis pivotal connection 33a at one end of the jack is of the male type fitting between the horizontally extending plates 15, 15 with vertical space between these plates permitting the piston rods to lie therebetween when the vehicle is steered to its extreme position, shown in Fig. 3, so as to provide adequate clearance. The clevis pivotal connection 32a on the other end of the jack is of the female type straddling the plate 22. The clevis type end connections 33a and 33a' are located between the wheels 27, 27 of the steerable member 20 and adjacent the steering axis 30 while clevis type end connections 32a and 32a' are located more remote from the axis 30 than those mentioned at the first-mentioned ends.

This construction permits the steerable member 20 to swing through a 180° arc about the steering axis 30 without interference. In other words, the steerable member 20 can swing from the straight ahead position in Fig. 2 a full 90° in one direction to the Fig. 3 position and then swing a full 180° back through the straight ahead position until it extends 90° on the other side thereof. This is possible because both jacks 31 and 31' are connected so as to swing with the frame 21, 22 of the steerable member 20 and therefore do not interfere with the wheels 27, 27 closely straddling the axis 30 but are also swingable with this frame 21, 22. Even in their most extreme positions, one of which being shown in Fig. 3, the jacks do not get substantially nearer the wheels than they do in the straight ahead position in Fig. 2. If the jacks were carried by the body member 10 (i. e., if the hoist pivots 32a and 32a' most remote from the pivot axis 30 were carried by the body member 10 instead of the steerable member 20), the jacks would interfere with the tires on wheels 27, 27 assuming the jacks were mounted in horizontal alignment in a low position between the wheels in the same general position as shown in the present invention. On the other hand, if the jacks were mounted in a high position above the top of the tires, the vehicle would lack rigidity because of the long vertical distance between the jacks and the front axle connecting the wheels 27, 27 so that the steering action would put unnecessary strain on the pivot pin 30. Hence, the illustrated construction provides rigidity by having the jacks close to the axle connecting the wheels 27, 27 and provides sharp turning by permitting the swinging of steerable member 20 through a full 180° arc without interference between steering jacks and steered wheels.

However, another problem also arises. When the steerable member 20 is turned from the Fig. 2 to the Fig. 3 position in steering the vehicle, jack 31 moves over dead center with its pivot connections 32a and 33a directly in alignment with the steering axis 30 when steering to about 35° has occurred. As the jack moves over the dead center position, the flow must be reversed in the jack 31 if it is going to exert force in the proper direction to continue steering action. It should be readily apparent that the jack 31 is contracting in length when moving from the solid line to the dot-dash line position in Fig. 2 and then it expands in length as it moves from the dot-dash line position in Fig. 2 to the solid line position in Fig. 3. Of course, at the time jack 31 moves over the dead center position, the jack 31 does not change in length and pressure fluid does not need to be supplied to either end at that moment.

Means is provided responsive to the steering action for reversing the fluid pressure flow to each jack individually as it swings over its dead center position during steering. In the present disclosure this means takes the form of a flow reversing valve 35 and a valve operating linkage therefor responsive to the relative movement between jack 31 and the steerable frame member 22.

The flow reversing valve 35 is fixed to the frame plate 22 of the steerable member 20 and includes a valve body 36, Fig. 4, divided into upper and lower practically identical valves with the lower one controlling jack 31 and the upper one controlling hoist 31'. Since both halves of this valve are basically identical, only the lower half will be described. This valve has a valve stem 37 for controlling jack 31 by endwise movement in valve body bore 36a. The lower valve stem 37 in Fig. 4 has peripheral grooves 37a and 37b for connecting the flow passageways therein. This valve stem 37 is shown in its left-hand position in Fig. 4 for providing a given direction of flow between valve 35 and jack 31, but it also has a center position cutting off pressure fluid flow to both ends of the jack 31 and a right-hand position for reversing the flow of the left-hand position. The valve has end closures 38 and 39 having as seals packing 38a and sealing ring 39a, respectively. When the valve stem 37 is in the right-hand position, it is nearly up against or actually contacting the left face of the end closure 39.

The valve body has ports and corresponding passageways serving, for example, as inlets 36b, 36b; exhaust or outlet 36c; ports and passageways 36e and 36e' leading to the upper ends of the cylinders 32 and 32' respectively, as seen in Fig. 2; and ports and passageways 36d and 36d' leading to the lower ends of the same cylinders. Ports 36b and 36c in Fig. 4 are shown in dot-dash line to indicate their vertical location since these ports are above the section line 4—4 in Fig. 1 and would not appear in a true Fig. 4 section. The only difference between the upper and lower half of the valve 35 in Fig. 4 is the crossover of the passageways shown by dotted lines at the top thereof so that ports 36d and 36e' are connected by the same passageway and ports 36e and 36d' are connected together by another passageway. This, of course, is necessary when steering from the normal straight ahead position in Fig. 2 with the valve stems in the Fig. 4 position, because during steering in one direction, one jack is normally expanding while the other is contracting in length.

A valve operating linkage or means is provided for actuating the valve stems of valve 35 between forward and reverse flow positions for controlling each valve half, and for reversing the flow therefrom as its associated jack goes over the dead center position.

This valve operating linkage, shown in more detail in Figs. 2 and 3 operatively connects the pivotally connected parts consisting of jack 31 and the frame plate 22 of steerable member 20, so as to be responsive to the relative movement between them about the pivotal connection formed by clevis 32a. Since the valve operating linkage on each side of the vertical or longitudinal center line in Fig. 2, through the steering axis 30, is identical, only the one on the right side will be described.

The valve operating linkage for jack 31 includes a bell crank 41 in Fig. 2 pivotally mounted at 41a on a base plate 40 secured to the frame plate 21 of the steerable member 20. One end of this bell crank 41 has a rotatably mounted cam follower roller 42 while the other end is pivotally connected to a link 43 at pivot 43b. This link 43 is pivotally connected at its upper end at 43a to valve stem 37 so that swinging the bell crank 41 will cause the valve stem 37 to move to one of its three positions. However, a compression spring 44 acts as a resilient means to normally bias the valve stem 37 to its left-hand flow position shown in Fig. 4 by having the compression spring 44 acting between the left arm of the bell crank 41 in Fig. 2 and the stop 40a fixed to the base plate 40. The valve stem 37 cannot move farther to the left in Fig. 4 because its shoulder engages against end closure 38.

The roller 42 is adapted to be pressed by spring 44 into engagement with a cam 49 secured by a base 48 to the outside surface of the jack cylinder 32. When these parts are engaged, the lower valve stem 37 in Fig. 4 is shifted over to its right-hand position and the flow to the jack 31 is reversed. This cam 49 has a valve actuating surface having an inclined approach surface 49a merging into a surface 49b having a generally constant radius of curvature about the pivotal axis of clevis 32a. When the roller 42 is operatively connected with the cam surface 49b, the valve stem 37 is kept by the remainder of the operating linkage in its right-hand position. The constant radius of curvature of surface 49b about the pivotal axis of clevis 32a assures that the linkage will not move during further steering while the roller 42 engages the surface 49b. Hence, the valve stem 37 neither moves out of its proper right-hand position nor is forced too far endwise so as to damage the valve 35.

Of course, the inclined approach surface 49a provides a smooth transition in the movement of the valve stem 37 from the left-hand position in Fig. 4, maintained by spring 44, to the right-hand position maintained by both spring 44 and cam surface 49b. Also, the initially engaged inclined portion of cam surface 49a causes the valve stem 37 to be moved to and located at the center position cutting off flow to both sides of the jack 31 at the proper time as it goes over the dead center position since no flow is necessary at that time.

Variations from the illustrated preferred structure can be readily apparent to one skilled in the art. For example, another cam surface could be provided in place of the valve stem stop by end closure 38 to keep the valve stem in the left-hand position shown in Fig. 4 with this cam surface also having a constant radius of curvature about the pivot formed by clevis 32a but having a smaller radius than cam surface 49b. No spring 44 would be required if the two cam surfaces formed a confining cam track for the roller 42. Also, it should be apparent that the parts of the linkage could be readily reversed on the pivotally connected parts consisting of jack 31 and frame plate 22. Also, the valve 35 could be responsive to the movement between the pivotally connected parts consisting of jack 31 and body member 10, instead of relative to steerable member 20, by having the valve and linkage mounted on one of the plates 15 instead of on plate 22.

The operation of this steering apparatus and the fluid pressure flow therein should now be apparent. Fig. 5 is a fluid flow diagram wherein a pump 50 pumps the fluid from a reservoir 51 through pipe line 52 to a directional steering valve 53 controlled by the steering wheel 53a in Fig. 1. This steering valve 53 is a flow reversing valve of any suitable type and may correspond to one-half of valve 35 in Fig. 4. Then, as the steering wheel 53a is rotated, it will move the valve stem of valve 53 and reverse the flow through lines 54 and 55 so that line 54 sometimes serves as the pressure fluid line while line 55 then serves as the exhaust, or return line, and other times the line 55 serves as the pressure line from the pump 50 while line 54 serves as the return line. The fluid returned to valve 53 by either of these lines is returned to the reservoir 51 by return line 56.

Consider the flow action when the steerable member 20 is turned from the Fig. 2 solid line, straight-ahead position to the Fig. 3 position for right turning. With the parts in the straight-ahead position in Fig. 2, the valve 53 is actuated until the line 54 becomes the pressure line and line 55 becomes the return fluid line. The pressure fluid in line 54 then flows through ports 36b past the peripheral groove 37a, out port 36d, through flow line 60 to contract the length of the jack 31 while the remaining fluid in the other side of the jack 31 exhausts through flow line 61, valve port 36e, past peripheral valve stem groove 37b, out valve port 36c, through return flow line 55, and back to the reservoir 51 by travelling through properly positioned steering valve 53 and the return line 56.

Because of the crossed over passageways in the valve 35 in Fig. 4, the pressure fluid to the jack 31' emerges from port 36e' instead of port 36d' so as to expand the jack 31' by flowing thereto through flow line 62 while exhausting through flow line 63 and port 36d' back to the same flow passageway as connected with port 36c. It should be noted that both valve stems 37 and 37' were in the Fig. 4 left-hand position during this phase of the steering action, and corresponding peripheral valve stem grooves provided the same flow passage functions. Also, both jacks 31 and 31' were turning the steerable member 20 in the same direction toward the Fig. 3 position even though the jack 31 was contracting and the jack 31' was expanding in length.

Now when the jack 31 is moving over the dead center position, shown in dot-dash line in Fig. 2, the valve stem 37 is moved to its central position by the valve actuating linkage roller 42 engaging the inclined cam surface 49a so as to move the valve stem 37 against the bias of the spring 44. When the valve stem 37 is in its central position over dead center either the fluid flow through flow lines 60 and 61 is prevented or the pressure is equalized. Hence, the flow of fluid to jack 31 is stopped and the jack does not change in length, but this does not interfere with the steering because no change in length is required at the dead center position.

As the roller 42 engages the cam surface 49b of constant radius, the valve stem 37 moves to its right-hand position in Fig. 4 so that now the pressure fluid from flow line 54, that enters through ports 36b, travels past the peripheral valve stem groove 37b, emerges out valve port 36e, and travels through the flow line 61 to expand the jack 31 in Fig. 5. Then, exhaust takes place from jack 31, through flow line 60, port 36d, past peripheral valve stem groove 37a, out port 36c, and back to the reservoir 51 through the flow lines 55 and 56. Of course, the flow through the upper half of the valve of Fig. 4 to jack 31' is not disturbed, so that after the jack 31 goes over the dead center position, both jacks 31 and 31' expand and continue to expand until the extreme position in Fig. 3 is reached.

It should be readily apparent that when the reversing type steering valve 53, which may correspond to one-half of the valve in Fig. 4, is moved to its central or neutral position, the fluid does not flow through the flow lines 54 and 55 and the vehicle is not steered. When the steering valve 53 is moved to the opposite position, flow lines 55 and 54 interchange their operation by respectively becoming the pressure fluid and return lines and the vehicle is steered in the opposite direction.

In the present disclosure, symmetrical jacks 31 and 31' have been provided so that one jack must turn the steerable member 20 while the other jack is moving over the dead center position and not exerting any force. The two jacks 31 and 31' are passing over their respective dead centers at different times so that each can assist the other when the need arises. However, it should be readily understood that other means can be provided for steering the vehicle when a jack moves over dead center position and this may take the form of other type mechanisms or a mere rearrangement of the hoists. However, the illustrated and described construction is the preferred one.

Since the cam surface 49b is of constant radius about the pivotal axis of the clevis 32a, the valve operating linkage does not move the valve stem 37 as the roller follower moves across this surface, even though jack 31 and frame plate 22 move relative to each other about this pivot. Therefore, link 43 can be a rigid link, if desired. However, when the linkage is not closely adjusted, there is always the danger of causing damage to the valve 35 so that a spring loaded link 43 is more advisable. This takes the form in Fig. 6 of clevises 70 and 71 and pivots 43a and 43b, respectively, operatively connected together. A headed bolt 74 is telescoped through a hole in clevis 70 with the bolt head acting as a stop shoulder and then screwed into a threaded hole in clevis 71 for adjustment purposes. End stop washers 72 and 73 are telescopically associated over the bolt 74 and respectively urged against clevises 70 and 71 by a compression spring 75 also urging the clevis 70 against the shoulder of the bolt head. Also, the valve actuating linkage is designed to cause the valve stem 37 to move to the right in Fig. 4 beyond its right-hand position when the follower roller 42 travels on the cam surface 49b. The right-hand end of the valve stem 37 then abuts against the left-hand face of the end closure 39 with the compression spring 75 allowing for the over travel of the actuating linkage. Hence, the valve stem 37 will be pushed to and kept in its right-hand position without damage to the valve because of the action of compression spring 75 even though the cam surface 49b may not be closely adjusted.

It should now be apparent that the power steering apparatus of the present invention provides several features. First, the steerable member 20 is capable of making sharp turns by rotating through a full 180° arc about the steering axis 30. Second, the steering hoists 31 and 31' cooperate together to assist each other. When one is in the over center position and not exerting a steering force, the other contributes to exert a steering force. When neither is in an over center position, both are continuously exerting a steering force in the same direction. Third, no interference occurs between the jacks 31, 31' and the wheels 27, 27 even though the jacks are mounted between the wheels for maximum rigidity.

Various changes in details and arrangement of parts can be made by one skilled in the art without departing from either the spirit of this invention or the scope of the appended claims.

What I claim is:

1. A vehicle, comprising a body member with a rolling support means, a steerable member pivotally connected about a generally vertical steering axis to said body member for steering movement about said axis between two extreme steered positions and having rolling support means straddling said axis and being spaced from the rolling support means on said body member, two fluid pressure operated jacks for steering said vehicle, means operatively connecting each jack at one end to said body member and at the other end to said steerable member so that the line of force exerted by each jack intercepts said steering axis in at least one position while said force passes from one side to the other of said axis during movement between said extreme steered positions, one jack and its connections being located on one side of the longitudinal center line of the vehicle through its steering axis when in straight ahead steering position, the other jack and its connections being located on the other side and means responsive to the steering action for reversing the fluid pressure flow to each jack as it swings over dead center position relative to said steering axis during steering with the line of force exerted by said jack intercepting said steering axis.

2. A vehicle, comprising a body member with a rolling support means, a steerable member pivotally connected about a generally vertical steering axis to said body member for steering movement about said axis between two extreme steered positions and having rolling support means straddling said axis and being spaced from the rolling support means on said body member, two fluid pressure operated jacks for steering said vehicle, means operatively connecting each jack at one end to said body member and at the other end to said steerable member so that the line of force exerted by each jack intercepts said steering axis in at least one position while said force passes from one side to the other of said axis during movement between said extreme steered positions, and means responsive to the steering action for reversing the fluid pressure flow to each jack as it swings over dead center position relative to said steering axis during steering with the line of force exerted by said jack intercepting said steering axis.

3. A vehicle, comprising a body member with a rolling support means, a steerable member pivotally connected about a generally vertical steering axis to said member and having rolling support means straddling said axis and being spaced from the rolling support means on said body member, two fluid pressure operated jacks for steering said vehicle with each jack being operatively connected at one end to said body member and at the other end to said steerable member, and means responsive to the steering action for reversing the fluid pressure flow to each jack as it swings over dead center position relative to said steering axis during steering with the line of force exerted by said jack intercepting said steering axis, said jack end connections with said members are pivotal connections with the pivotal connections of one jack lineally alignable with said steering axis in the dead center position of said jack with this alignment adapted to be assumed in at least one position between opposite extreme steered position of said vehicle, and wherein the connections at said one end are located between the rolling support means of said steerable member adjacent said steering axis.

4. A vehicle, comprising a body member with a rolling support means, a steerable member pivotally connected about a generally vertical steering axis to said body member for steering movement about said axis between two extreme steered positions and having rolling support means, a fluid pressure operated jack for steering said vehicle, means operatively connecting said jack at opposite ends respectively to said members so that the line of force exerted by said jack intercepts said steering axis in at least one position while said force passes from one side to the other of said axis during movement between said extreme steered positions, and means responsive to the relative movement between said jack and one of said members for reversing the operating fluid pressure flow thereto as it swings over dead center position relative to said steering axis during steering with the line of force exerted by said jack intercepting said steering axis.

5. A vehicle, comprising a body member with a rolling support means, a steerable member pivotally connected about a generally vertical steering axis to said body member and having rolling support means, a fluid pressure operated jack for steering said vehicle by being operatively connected at opposite ends respectively to said members, said jack and one of said members forming parts of said vehicle, the aforesaid operative connection between said parts being a pivotal connection, a flow reversing valve for siad jack fixed to one of said parts, an operating means for actuating said valve between forward and reverse flow positions, said means operatively connecting said parts and including a valve actuating surface carried by one of said parts and a follower for said surface carried by the other of said parts, said surface having a generally constant radius of curvature about the axis of said pivotal connection for keeping said valve in one of said flow positions.

6. A vehicle, as set forth in claim 5, wherein said valve operating means includes resilient means normally biasing said valve to the other flow position when said surface is not operatively effective.

7. A vehicle, comprising a body member with a rolling support means, a steerable member pivotally connected about a generally vertical steering axis to said body member for steering movement about said axis between two extreme steered positions and having rolling support means, a fluid pressure operated jack for steering said vehicle, means operatively connecting said jack at opposite ends respectively to said members so that the line of force exerted by said jack intercepts said steering axis in at least one position while said force passes from one side to the other of said axis during movement between said extreme steered positions, said jack and one of said members forming parts of said vehicle, the aforesaid operative connection between said parts being a pivotal connection, a flow reversing valve for said jack fixed to one of said parts, an operating means for actuating said valve between forward and reverse flow positions, said means operatively connecting said parts and including a valve actuating surface carried by one of said parts and a follower for said surface carried by the other of said parts, said surface having a generally constant radius of curvature about the axis of said pivotal connection for keeping said valve in one of said flow positions, said valve operating means including resilient means normally biasing said valve to the other flow position when said surface is not operatively effective, and means for steering said vehicle when said jack moves over dead center position relative to said steering axis with the line of force exerted by said jack intercepting said steering axis.

8. A vehicle, as set forth in claim 7, wherein each end connection of said jack is a pivotal connection and both said end connections are locatable on the same side of a longitudinal center line through the steering axis, wherein said connection with said body member is located close to said axis and said connection with said steerable member is located remote therefrom, and wherein the rolling support means on said steerable member closely straddles said axis and hoist but said steerable member can turn through a 180° arc about said steering axis.

9. A vehicle, comprising a body member with a rolling support means, a steerable member pivotally connected about a generally vertical steering axis to said body member and having rolling support means straddling said axis and being spaced from the rolling support means on said body member, two fluid pressure operated jacks for steering said vehicle, means operatively connecting each jack at one end to said body member and at the other end to said steerable member so that turning will continue smoothly in any given direction only if the flow is reversed to one of said jacks at one predetermined steered position during turning on one side of a straight ahead position and is reversed to the other of said jacks at another predetermined steered position during turning on the other side of the straight ahead position, and flow control means for reversing the flow to one of said jacks at said one position and to the other of said jacks at said other position.

10. A vehicle, as set forth in claim 9, including steering control means for reversing the direction of flow to said jacks through said flow control means, whereby reversal of flow by said steering control means reverses the direction of steering and whereby flow in one direction through said steering control means is capable of steering said steerable member in one direction from one extreme steered position to the other through the straight ahead position.

11. A vehicle, comprising a body member with a rolling support means, a steerable member pivotally connected about a generally vertical steering axis to said body member and having rolling support means straddling said axis and being spaced from the rolling support means on said body member, two fluid pressure operated jacks for steering said vehicle with each jack being operatively connected at one end to said body member and at the other end to said steerable member, one jack and its connections being located on one side of the longitudinal center line of the vehicle through its steering axis when in straight ahead steering position, and the other jack and its connections being located on the other side, one of said members including a beam approximately equally spaced from said jacks and extending generally horizontally away from said steering axis and having thereon the connection of each jack most remote from said steering axis while the other jack connections are on the other of said members, control means on said beam operatively connected to both jacks and responsive to movement therebetween for reversing the fluid pressure flow to each jack as it swings over dead center position relative to said steering axis with the line of force exerted by said jack intercepting said steering axis.

12. A vehicle, as set forth in claim 4, wherein said one member is said steerable member.

13. A vehicle, comprising a body member with a rolling support means, a steerable member pivotally connected about a generally vertical steering axis to said body member and having rolling support means straddling said axis and being spaced from the rolling support means on said body member, two fluid pressure operated jacks for steering said vehicle with each jack being operatively connected at one end to said body member and at the other end to said steerable member, and control means responsive to relative movement between an element operatively connected intermediate the aforesaid ends of at least one of said jacks and operatively connected to one of said members for affecting the steering force exerted by at least one of said jacks so that said steerable member can be steered through approximately a 180° arc between extreme steered positions.

14. A vehicle comprising a body member with rolling support means, a steerable member pivotally connected on a generally vertical steering axis to said body member and having rolling support means spaced from the rolling support means on said body member, two fluid pressure operated jacks for steering said vehicle with each jack being directly pivotally connected at one end to said body member and at the other end to said steerable member, said jack end connections with said members being to the rear of said steering axis when said vehicle is in a straight ahead position, and the connection of each jack to said steerable member being located farther from said steering axis than its connection to said body member.

15. A vehicle comprising a body member with rolling support means, a steerable member pivotally connected on a generally vertical steering axis to said body member and having rolling support means spaced from the rolling support means on said body member, two fluid pressure operated jacks for steering said vehicle with each jack being directly pivotally connected at one end to said body member and at the other end to said steerable member, the jack connections to said body member being located a fixed distance from said steering axis, and all of the jack connections being located to the rear of said steering axis when said vehicle is in a straight ahead position.

16. A vehicle comprising a body member with rolling support means, a steerable member pivotally connected on a generally vertical steering axis to said body member and having rolling support means, means for steering said vehicle including a fluid pressure operated jack directly pivotally connected at opposite ends respectively to said members on the same side of a longitudinal center line through said steering axis with the vehicle in a straight ahead position, the connection of said jack with said body member being located closer to said axis than the connection of said jack with said steerable member, and both of said connections being to the rear of said axis with said vehicle in a straight ahead position.

17. A vehicle comprising a body member with rolling support means, a steerable member pivotally connected on a generally vertical steering axis to said body member and having rolling support means spaced from the rolling support means on said body member, means for steering said vehicle including a fluid pressure operated jack, means operatively connecting said jack at one end to said body member and at the other end to said steerable member, and control means carried by one of said members and responsive to relative movement between said one member and said jack in steering between a straight ahead position and an extreme steered position for changing the direction of the steering force exerted by said jack while steering between said positions.

18. A vehicle comprising a body member with rolling support means, a steerable member pivotally connected on a generally vertical steering axis to said body member and having rolling support means spaced from the rolling support means on said body member, two fluid pressure operated jacks for steering said vehicle with each jack being operatively connected at one end to said body member and at the other end to said steerable member, and control means carried by one of said members and responsive to relative movement between said one member and one of said jacks for changing the direction of steering force exerted by at least one of said jacks in steering between a straight ahead position and an extreme steered position.

19. A vehicle comprising a body member with rolling support means, a steerable member pivotally connected on a generally vertical steering axis to said body member and having rolling support means spaced from the rolling support means on said body member, means for steering said vehicle including a fluid pressure operated jack, means operatively connecting said jack at one end to said body member and at the other end to said steerable member, and control means carried by one of said members and operably engageable with said jack in response to relative movement between said one member and said jack in steering between a straight ahead position and an extreme steered position for changing the direction of the steering force exerted by said jack while steering between said positions.

20. A vehicle comprising a body member with rolling support means, a steerable member pivotally connected on a generally vertical axis to said body member and having rolling support means spaced from the rolling support means on said body member, a carriage secured to said steerable member and extending rearwardly from said axis, means for steering said vehicle including a fluid pressure operated jack pivotally connected to said body member at a fixed point relative to said axis and pivotally connected to said carriage, the pivotal connection of said jack to said carriage being disposed relative to said axis and said jack pivotal connection to said body member whereby said jack passes through dead center in a steering position intermediate a straight ahead vehicle position and an extreme steered position of said vehicle, and control means mounted on said carriage and responsive to relative movement between said carriage and said jack for changing the direction of steering force exerted by said jack in steering between said straight ahead and extreme steered positions.

21. A vehicle comprising a body member with rolling support means, a steerable member pivotally connected on a generally steerable vertical axis to said body member and having rolling support means spaced from the rolling support means on said body member, a carriage secured to said steerable member and extending longitudinally rearwardly from said axis with said vehicle in a straight ahead position, two fluid pressure operated steering jacks pivotally connected to said body member at fixed points relative to said axis and pivotally connected to said carriage, at least one of said jacks being movable relative to said carriage while said vehicle is being steered from a straight ahead to an extreme steered position, control means mounted on said carriage and responsive to the movement between said carriage and said one jack to change the direction of steering force exerted by said one jack in steering between said straight ahead position and said extreme steered position.

References Cited in the file of this patent

UNITED STATES PATENTS

| | | |
|---|---|---|
| 1,358,974 | Mowbray | Nov. 16, 1920 |
| 2,269,502 | Wilson | Jan. 13, 1942 |
| 2,374,410 | Brumbaugh | Apr. 24, 1945 |
| 2,376,979 | Patterson | May 29, 1945 |
| 2,557,066 | Armington | June 19, 1951 |
| 2,638,998 | Rockwell | May 19, 1953 |